(Model.)
A. D. CLARK.
GRAIN DRILL.
No. 313,808.   Patented Mar. 10, 1885.
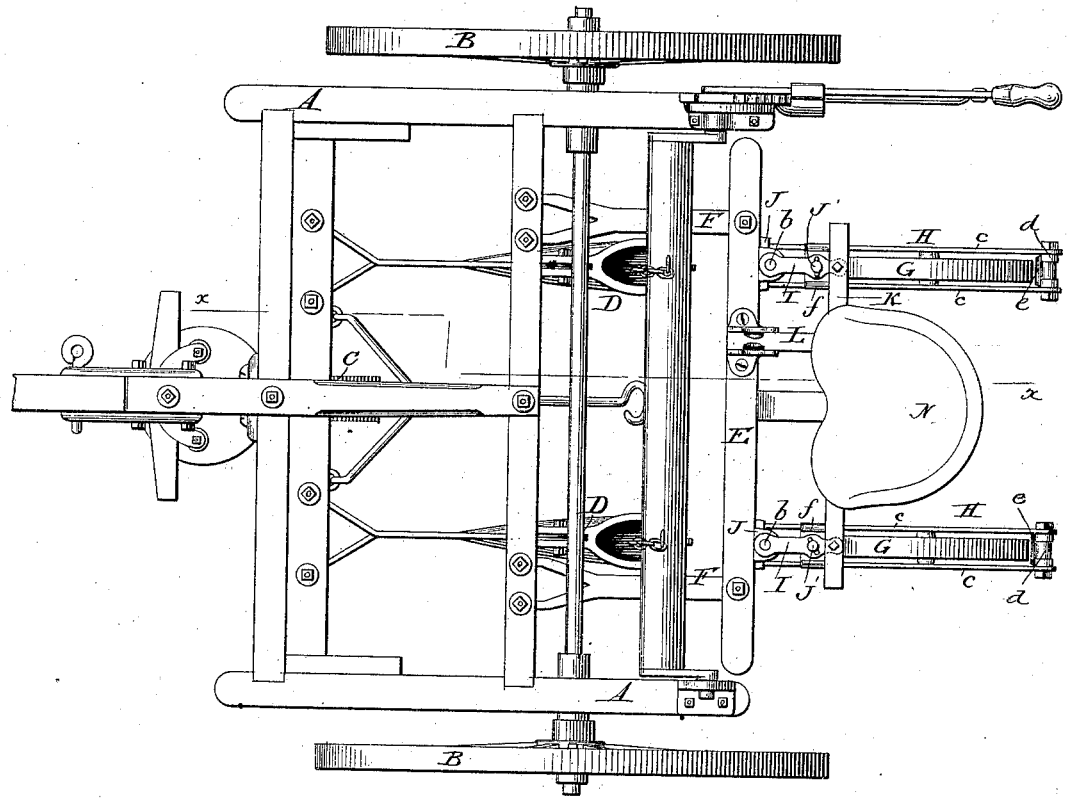
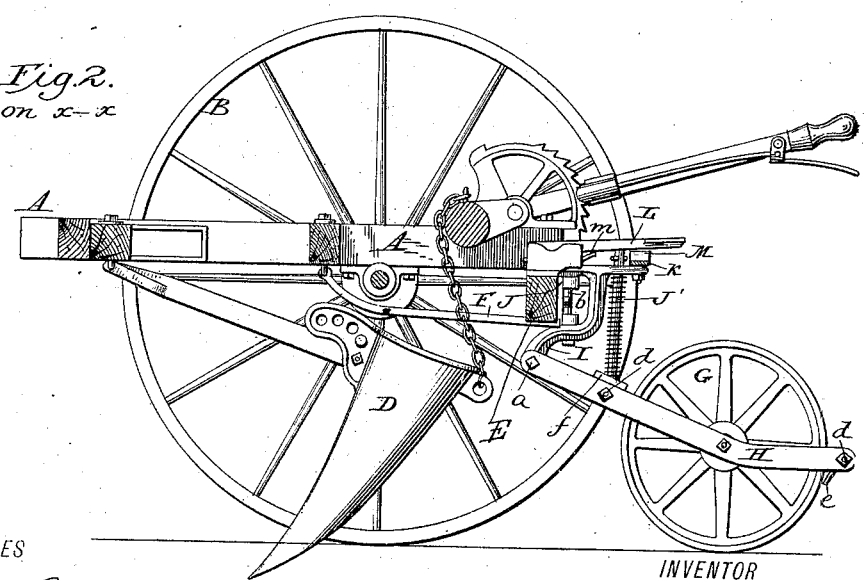
WITNESSES
Sidney P. Hollingsworth
W. H. Shipby
INVENTOR
A. D. Clark
By P. T. Dodge
Attorney (Model.)
A. D. CLARK.
GRAIN DRILL.
No. 313,808. Patented Mar. 10, 1885.
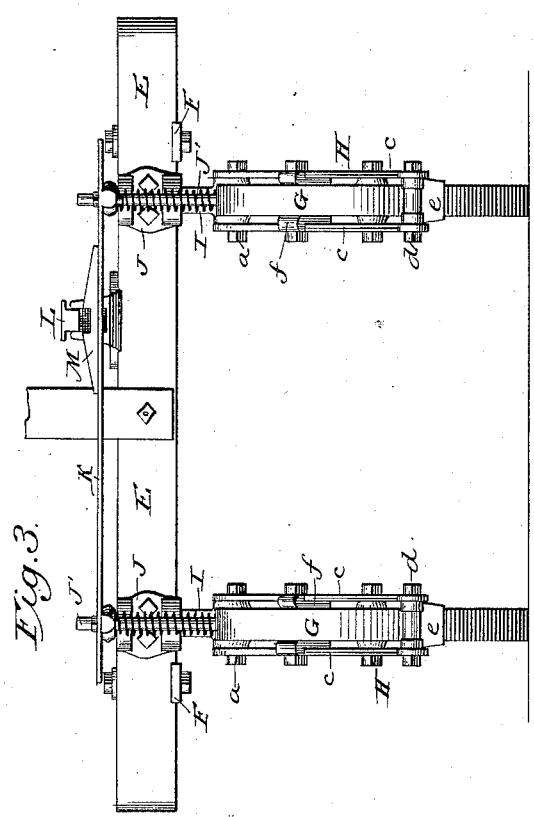
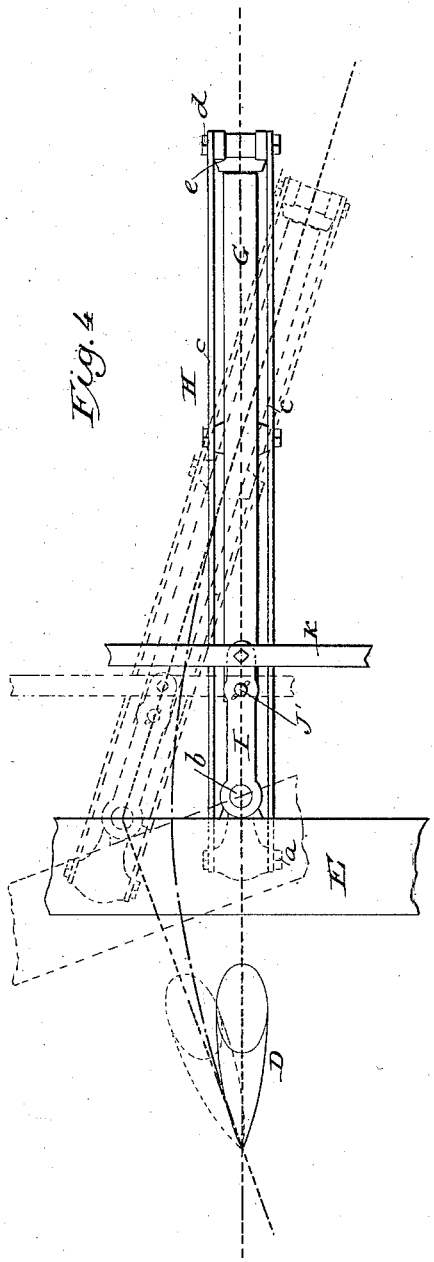
WITNESSES
Sidney P. Hollingsworth
W. H. Shipley
INVENTOR
A. D. Clark
By P. T. Dodge
Attorney

UNITED STATES PATENT OFFICE.

ALFRED D. CLARK, OF SPRINGFIELD, OHIO, ASSIGNOR TO GEORGE W. STARTZMAN, OF SAME PLACE.

GRAIN-DRILL.

SPECIFICATION forming part of Letters Patent No. 313,803, dated March 10, 1885.

Application filed September 23, 1884. (Model.)

*To all whom it may concern:*

Be it known that I, ALFRED D. CLARK, of Springfield, in the county of Clark and State of Ohio, have invented certain Improvements in Grain-Drills, of which the following is a specification.

The object of this invention is to provide a roller-pressure attachment for ordinary grain-drills for the purpose of pressing the soil upon the grain deposited in the furrows.

My attachment consists, essentially, of a series of rollers arranged to follow the hoes or drill-teeth, and connected with the main frame in such manner that they will swing both laterally and vertically in relation thereto, as hereinafter explained.

Referring to the drawings, Figure 1 represents a top plan view of an ordinary grain-drill having my attachment applied thereto. Fig. 2 represents a longitudinal vertical section of the same on the line $x\ x$. Fig. 3 is a rear elevation showing the details of the device for locking the rollers against lateral movement. Fig. 4 is a diagram illustrating the manner in which the pressure-rolls are caused to follow the path of the hoes.

Referring to the drawings, A represents the rectangular drill-frame; B, the two main wheels on which it is carried; C, the forward caster-wheel, and D the drill-teeth connected to the frame by drag-bars.

The foregoing parts are constructed and arranged to operate in the ordinary manner and constitute no part of my invention. They may be of the form and arrangement shown, or of any other approved form, and may be combined with the usual appliances for delivering seed to the hoes.

Referring now to the parts to which my invention relates, E represents a bar lying transversely in rear of the drill-frame and carried by two vertically-swinging arms, F, which have their rear ends bolted firmly to the bar, and their forward ends jointed to the cross-bar of the drill-frame, or otherwise suitably jointed to the drill-frame, preferably at a point slightly in advance of the axle. The essential requirement in this connection is that the bar E shall be jointed to the frame in such manner as to swing vertically, and it is manifest that the connection may be modified in form and detail.

To the bar E, I attach, by devices which will presently be described, a series of pressure rolls or wheels, G, one in rear of each drill-tooth. Each of these wheels is mounted in an arm, H, the forward end of which is connected by a horizontal pivot, $a$, to a bracket, I, which is in turn connected by a vertical pivot, $b$, to a plate, J, bolted firmly to the cross-bar E, as shown in Figs. 1 and 2. The pivot $a$ permits the arms H and the pressure-rolls to rise and fall independently of the drill-frame and teeth, while the pivot $b$ permits the rolls to swing horizontally. The swinging bracket or hinged connection I has its lower end extended forward in the manner represented in Fig. 2, and it is to its forward extension that the roll-carrying arm is pivoted. The object of this forward extension is to permit the rolls to be brought forward in the proper proximity to the hoes. The upper end of each bracket I is extended rearward, and serves as a guide for the upper end of a rod, J', which is passed loosely through the same and pivoted at its lower end to the arm H. This rod is encircled by a spiral spring bearing at the upper end against the bracket and at the lower end against a collar or pin on the rod, so that its force is applied to press the roller downward.

For the purpose of compelling the rolls to travel in parallel paths at uniform distances apart, and to prevent them from turning about in an objectionable manner in the event of the machine being moved backward, I connect the entire series of brackets I by means of a cross-bar, K, pivoted thereto.

For the purpose of locking the rolls against lateral motion, I connect to the bar E, by means of a horizontal pivot and a supporting-plate, a vertically-swinging latch, L, arranged to engage in a notched plate, M, secured to the top of the connecting-bar K. A spring, $m$, holds the latch normally in an elevated position out of engagement with the bar, so that the rolls may be swung laterally without hinderance. When, however, the latch is depressed to engage the plate, the rolls are held securely against lateral motion.

To the bar E, I secure a standard, the upper end of which sustains a seat, N, to carry the operator whose weight is thus applied through the intermediate parts to the rolls G.

It will be observed that as the entire series of rolls are connected to the cross-bar E, and the bar in turn jointed to the frame, the entire series of rolls will be permitted to rise and fall in unison, while at the same time the pivots *a* permit the rolls to rise and fall independently of each other and of the bar E, each subject to the action of its own depressing-spring. The latch L is arranged in such relation to the seat that it may be conveniently depressed by the foot of the operator.

Owing to the position in which the rolls are connected to the frame by the vertical pivots, they are caused to follow the line of the furrows formed by the hoes, and this notwithstanding the fact that the hoes may follow a sinuous or irregular path. This trailing action of the hoes is clearly illustrated in Fig. 4, in which the natural course of the rolls when the machine travels in a straight line is represented by full lines, while the dotted lines represent the course of the rolls in following the hoes through a curved path.

The arms H, in which the rolls are mounted, may be of any suitable construction; but it is preferred to construct each arm of two side bars or plates, *c*, secured by transverse bolts *d* to opposite sides of intermediate plates, *e* and *f*. The rear plates, *e*, may have their lower ends brought to an edge in order that they may serve as scrapers to remove the adhering soil on the surface of the rolls. By loosening the bolts the scrapers may be released, so that their edges may be adjusted to conform to the rolls, as required. The forward plates, *f*, are slotted vertically to receive and guide the lower ends of the rods J', which are guided and held in position thereby.

Having thus described my invention, what I claim is—

1. The grain-drill, in combination with the vertically-swinging cross-bar jointed thereto, the vertically and laterally swinging arms jointed to said bar, and the rolls carried by said arms.

2. The combination, substantially as described, of the grain-drilling machine, the cross-bar jointed thereto to swing vertically, the driver's seat mounted on said bar, the pressure-rolls, the roll-carrying arms jointed to the cross-bar to swing both laterally and vertically, and the pressure-springs acting on the individual arms.

3. In combination with the grain-drill, a vertically-swinging cross-bar jointed thereto, a series of pressure-rolls in rear of the drill-teeth, roll-carrying arms jointed to said bar to swing both laterally and vertically, pressure-springs acting on the individual arms, and a cross-bar connecting said arms to cause the simultaneous lateral motion of the rolls.

4. In combination with the cross-bar E, jointed to a grain-drill, the pivoted brackets I, having their ends extended forward, and the roll-carrying arms pivoted to the said ends, as described and shown.

5. In combination with the bar E, hinged to a grain-drill, the laterally and vertically swinging roll-carrying arms H, jointed to the cross-bar, the connecting-bar K, and the locking device to prevent lateral motion of the rolls.

6. In combination with the plate J and roll-carrying arm H, the bracket or hinge I, having its ends extended forward and backward, respectively, and the connecting-pivots *a* and *b*.

7. In combination with the pivoted bracket I, having its ends extended forward and backward, as described, the roll-carrying arm H, pivoted thereto, the sliding rod J', and the spring on said rod.

8. In a grain-drill, the main frame and the hoes jointed thereto, in combination with the series of pressure-rolls, each mounted in a laterally and vertically swinging arm jointed to the frame independently of the hoes, and each provided with a pressure-spring.

9. In combination with a grain-drill, a rear seat-supporting bar hinged thereto to swing vertically, and a series of independently rising and falling pressure-rolls attached to said bar by jointed arms and springs, substantially in the manner described and shown.

10. The roller attachment for application to grain-drills, consisting of the cross-bar provided with carrying-arms and the driver's seat, the arms H, jointed to said bar to swing both vertically and laterally, the rollers mounted in said arms, and the springs acting to depress said arms.

In testimony whereof I have hereunto set my hand, this 8th day of August, 1884, in the presence of two attesting witnesses.

ALFRED D. CLARK.

Witnesses:
JNO. M. SPECK,
H. S. SHOWERS.